US008162649B2

(12) United States Patent
Valter et al.

(10) Patent No.: US 8,162,649 B2

(45) Date of Patent: Apr. 24, 2012

(54) DEVICE FOR ELIMINATING OVERSIZE PELLETS FROM BALLING DISKS

(75) Inventors: Sergio Francisco Valter, Cariacica (BR); Sergio Geraldo Vescovi, Carlacica (BR); Jose Otavio Belmonte Machado, Vila Velha (BR); Dilson Pereira Correia, Vila Velha (BR); Ranunfo Ramos Lima, Vitoria (BR); Rogerio Carlos Eler, Vila Velha (BR)

(73) Assignee: Companhia Vale do Rio Doce, Santa Luzia, Minas Gerais (BR)

( * ) Notice: Subject to any disclaimer, the term of this patent is extended or adjusted under 35 U.S.C. 154(b) by 826 days.

(21) Appl. No.: 11/667,058

(22) PCT Filed: Nov. 4, 2005

(86) PCT No.: PCT/BR2005/000230

§ 371 (c)(1),
(2), (4) Date: Jan. 7, 2008

(87) PCT Pub. No.: WO2006/047846

PCT Pub. Date: May 11, 2006

(65) Prior Publication Data

US 2008/0206386 A1 Aug. 28, 2008

(30) Foreign Application Priority Data

Nov. 4, 2004 (BR) ..................................... 8402689

(51) Int. Cl.
*B01J 2/14* (2006.01)

(52) U.S. Cl. ........ 425/222; 425/141; 425/196; 425/256; 425/333; 425/DIG. 101; 264/117; 264/310; 209/359; 209/361; 23/313 R; 23/313 P

(58) Field of Classification Search .................. 425/222, 425/141, 182, 196, 225, 256, 332, 333, DIG. 101; 264/117, 310; 294/19.1, 23, 24, 26; 209/359, 209/361; 65/141; 23/313 P, 313 R; 366/313
See application file for complete search history.

(56) References Cited

U.S. PATENT DOCUMENTS

| | | | | | |
|---|---|---|---|---|---|
| 2,308,769 | A | * | 1/1943 | Meinzer | 65/20 |
| 3,110,572 | A | * | 11/1963 | Von Reppert | 34/428 |
| 3,335,456 | A | * | 8/1967 | Takeuchi et al. | 425/222 |
| 3,345,683 | A | * | 10/1967 | Eirich et al. | 425/222 |
| 3,883,281 | A | * | 5/1975 | Holley | 425/222 |
| 4,031,175 | A | * | 6/1977 | Cooper | 264/40.7 |
| 4,197,115 | A | | 4/1980 | Suzuki et al. | 75/3 |
| 4,210,242 | A | * | 7/1980 | Mullen | 206/231 |
| 4,212,613 | A | * | 7/1980 | Seng | 425/141 |

(Continued)

FOREIGN PATENT DOCUMENTS

GB 1072328 6/1967

(Continued)

*Primary Examiner* — Joseph Del Sole
*Assistant Examiner* — Seyed Masoud Malekzadeh
(74) *Attorney, Agent, or Firm* — Jacobson Holman PLLC

(57) ABSTRACT

Device for eliminating oversize pellets from balling disks, includes a plow-like tool defined by a series of cylindrical rods that are coplanar and parallel to each other and incorporated into a horizontal plate, whose medial portion incorporates a vertical tubular arm that protrudes vertically and upwards to pass axially through and be selectively and adjustably attached to a vertical sleeve that is incorporated in a distal portion of an extensible arm, which composes a trussed structure that is adjacently attached to a balling disk and protrudes over its area of operation.

2 Claims, 3 Drawing Sheets

U.S. PATENT DOCUMENTS

| | | | | | |
|---|---|---|---|---|---|
| 4,214,863 | A | * | 7/1980 | Nixon | 425/222 |
| 4,286,893 | A | * | 9/1981 | Pomares | 403/301 |
| 4,330,246 | A | * | 5/1982 | Varrasso | 425/140 |
| 4,382,050 | A | * | 5/1983 | Seng | 264/40.4 |
| RE31,574 | E | * | 5/1984 | Seng | 425/141 |
| 4,564,505 | A | * | 1/1986 | Alfrey | 422/209 |
| 4,726,755 | A | * | 2/1988 | Holley | 425/222 |
| 4,881,887 | A | * | 11/1989 | Holley | 425/222 |
| 5,538,302 | A | * | 7/1996 | Travis | 294/24 |
| 6,468,066 | B1 | * | 10/2002 | Rowlett | 425/196 |

FOREIGN PATENT DOCUMENTS

| | | |
|---|---|---|
| JP | 60-75528 | 4/1985 |
| JP | 2001-107122 | 4/2001 |

* cited by examiner

DEVICE FOR ELIMINATING OVERSIZE PELLETS FROM BALLING DISKS

This is a national stage of PCT/BR2005/000230 filed 4 Nov. 2005 and published in English.

FIELD OF THE INVENTION

The present invention concerns a device for eliminating oversize pellets from balling disks of the type that exists at ore pelletizing plants. More specifically, it concerns a tool to be used along with pelletizing disks during the production of unfired ("green") pellets in order to prevent the formation of pellets that are larger than the specified size, i.e., the above-mentioned oversize pellets.

BACKGROUND OF THE INVENTION

As is known to those skilled in the art, iron ore is one of the most widely produced and consumed mineral substances in the world. In economic terms, the iron mining industry is vitally important for the countries that produce it, such as Brazil, for example, where iron ore accounts for as much 15% of the country's total mineral production and a significant portion of the iron ore produced is destined for the foreign market.

Commercially, iron ores produced for export are products found in the forms of natural ore, granulated ore, sinter feed, pellet feed and agglomerated ore, i.e. pellets.

Generally speaking, in order to obtain iron ores in the form of pellets it is necessary to subject dressed ore to the pelletization process, whose aim is to agglomerate ore fines, coal and other minerals into a spherical shape and subsequently fire them, i.e. sinter these pellets in special furnaces.

More specifically, the pelletization process comprises five stages: 1) thickening, in which concentrated ore pulp is collected in specific tanks (thickeners) that increase the percentage of pulp solids by 70% to 75%; 2) filtration, in which vacuum filters and pumps work together to remove water from the iron ore pulp, reducing the moisture content to an appropriate level; 3) Mixing or crushing, in which the product of filtration (pellet feed) is stored in appropriate silos and mixed with other ores in mechanical stirrers in order to create physical and chemical conditions that are favorable to pellet formation; 4) balling, in which unfired ("green") pellets are formed on balling disks; and 5) hardening or firing, in which the unfired or green pellets formed on the balling disks are subjected to careful thermal treatment in furnaces, giving them the physical and mechanical strength appropriate for handling and transportation to the consuming market.

Thus, as taught above, the formation of unfired pellets, also known as "green" pellets, occurs on the balling disks.

In said devices, the material (iron ore) is sprayed with a certain amount of water (8-9% moisture). As the ore comes into contact with the circular surface of the disk, which is maintained in a slightly inclined position and rotates at a given speed, and because said ore is permanently driven to the ascending portion of the disk, friction between the ore granules starts to form pellets, which, through repeated, constant rotation, results in the addition of material until a specific desired size is achieved.

In this stage, rigorous control of the agglomeration process is fundamental, as a basic condition for obtaining a final product that meets market requirements regarding product quality, since granulometric range control is a key requirement for the reduction process that is subsequently performed by steel mills.

However, as is known to those skilled in the art, it is not always possible to maintain a consistently high quality level of the pellets being formed. That is because, during production of unfired pellets on said balling disks, a number of inconveniences occur that prevent obtainment of ore pellets whose composition and dimensions are uniform and suited to the requirements of the consuming market.

Among these inconveniences, there stands out the formation of pellets that are larger than the standard sizes. These large pellets are known in the steel industry as "oversize pellets."

It is known that the formation of oversize pellets is common, since they result from the very movement of the balling disk. In other words: the moist pellets accumulate large amounts of agglutinant material, where the ore nuclei that form oversize pellets collide with the ideally sized pellets, causing the latter ones to break. Consequently, by incorporating these fractions, the volume of the material to be fed back to the balling circuit increases, which tends to interfere with process productivity, thus reducing the output and increasing production costs.

Thus, it becomes necessary for operators to frequently intervene during the pelletization process (balling stage) to remove these undesired oversize pellets, often using spears and shovels.

Even though it is possible to remove oversize pellets, operators regard this task as laborious and physically demanding, since they are constantly subjected to ergonomically incorrect positions which, over time, tend to do harm to their health.

Another reason for this oversize pellet removal procedure is considered inappropriate relates to the fact that pellet quality control by operators is subject to errors, due to the large number of balling disks to be monitored and also because the balling process is virtually uninterrupted.

SUMMARY OF THE INVENTION

Therefore, one of the aims of the present invention is to provide a device for eliminating oversize pellets from balling disks which is capable of promptly and constantly removing pellets that achieve such a diameter that may cause them to be classified as oversize pellets, thus preventing iron pellets of appropriate diameters from being broken or destroyed by the oversize pellets' remaining on the balling disk.

Another aim of the present invention is to provide a device for eliminating oversize pellets from balling disks which does not require the direct intervention of operators using tools to remove pellets of undesired diameters.

These and other objectives and advantages of the present invention are achieved by a device for eliminating oversize pellets from balling disks, which is comprised of a plow-like tool defined by a series of cylindrical rods that are coplanar and parallel to each other and incorporated into a horizontal plate, whose medial portion incorporates a vertical tubular arm that protrudes vertically and upwards, passing axially through and being selectively and adjustably attached to a vertical sleeve that is incorporated to the distal portion of an extensible arm, which composes a trussed structure that is adjacently attached to the balling disk and protrudes over its area of operation.

BRIEF DESCRIPTION OF THE DRAWINGS

The present invention is described below in reference to the attached drawings, where.

DETAILED DESCRIPTION OF THE PREFERRED EMBODIMENTS

Figure 1:
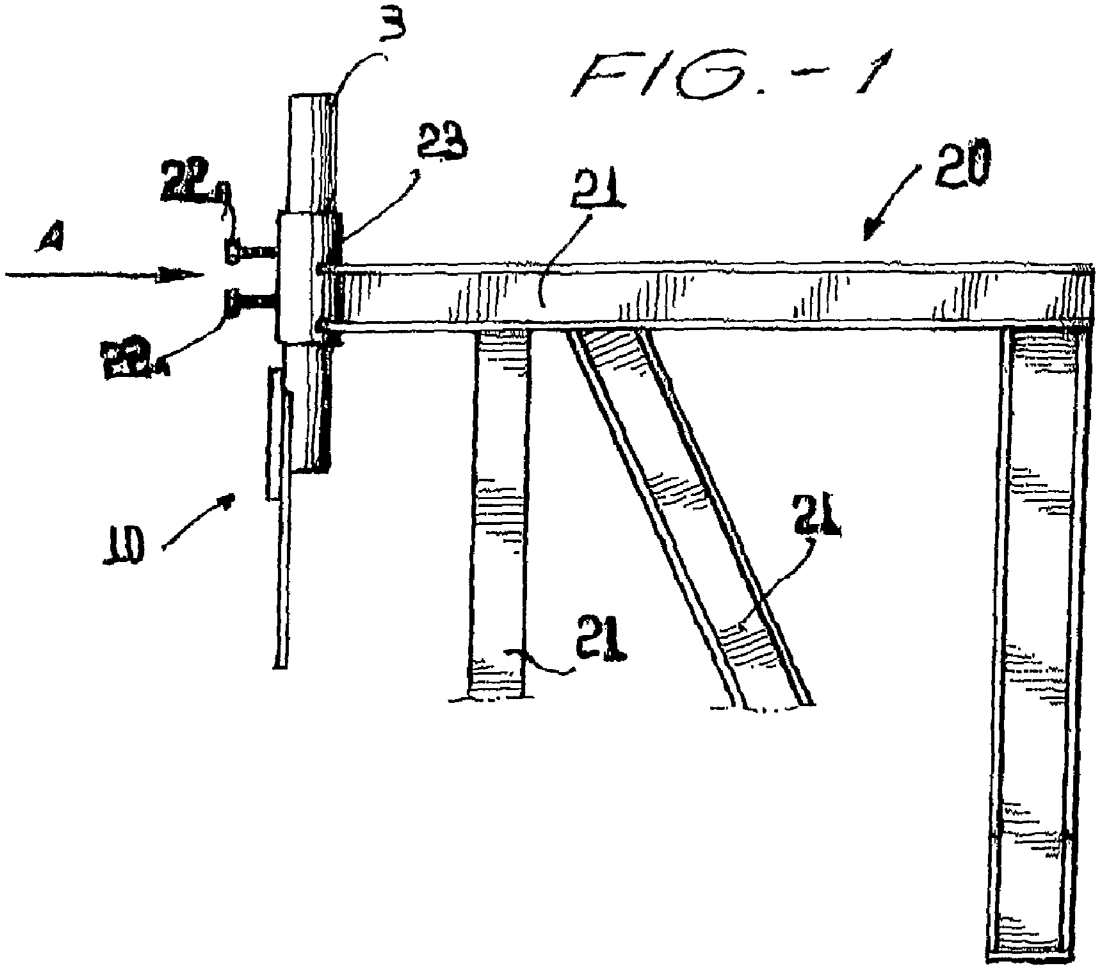
FIG. 1 shows a lateral view of the device for eliminating oversize pellets from balling disks.
Figure 2:
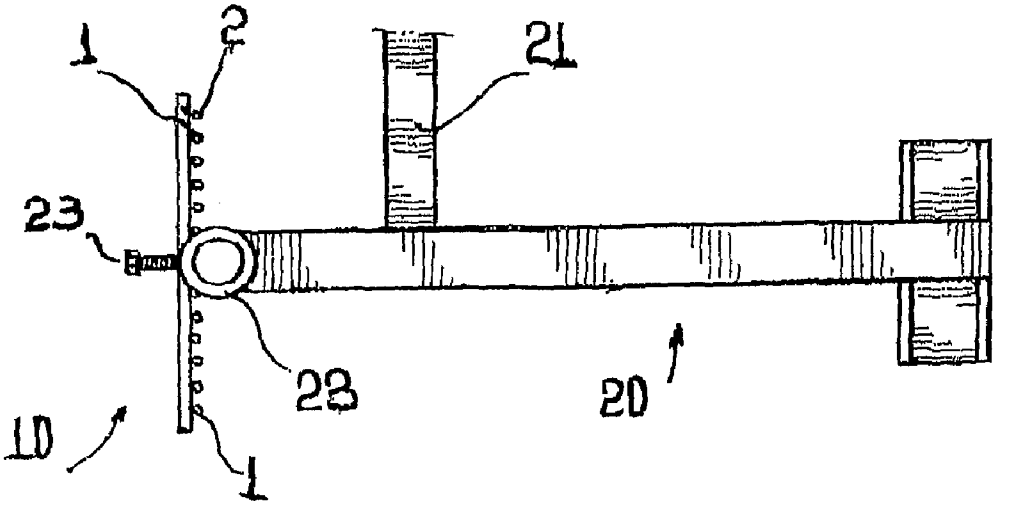
FIG. 2 shows a top view of the device for eliminating oversize pellets from balling disks.

According to these illustrations, the device for eliminating oversize pellets from balling disks, which is the object of the present invention, is comprised of a plow-like tool 10 defined by a series of cylindrical rods 1 that are coplanar and parallel to each other and incorporated into a horizontal plate 2, whose medial portion incorporates a vertical tubular arm 3 that protrudes vertically and upwards so as to pass axially through and be selectively and adjustably attached to a vertical sleeve 23 that is incorporated to the distal portion of an extensible arm 21, which composes a trussed structure 20 that is adjacently attached to the balling disk 30 and protrudes over its area of operation. See figures.

Figure 3:
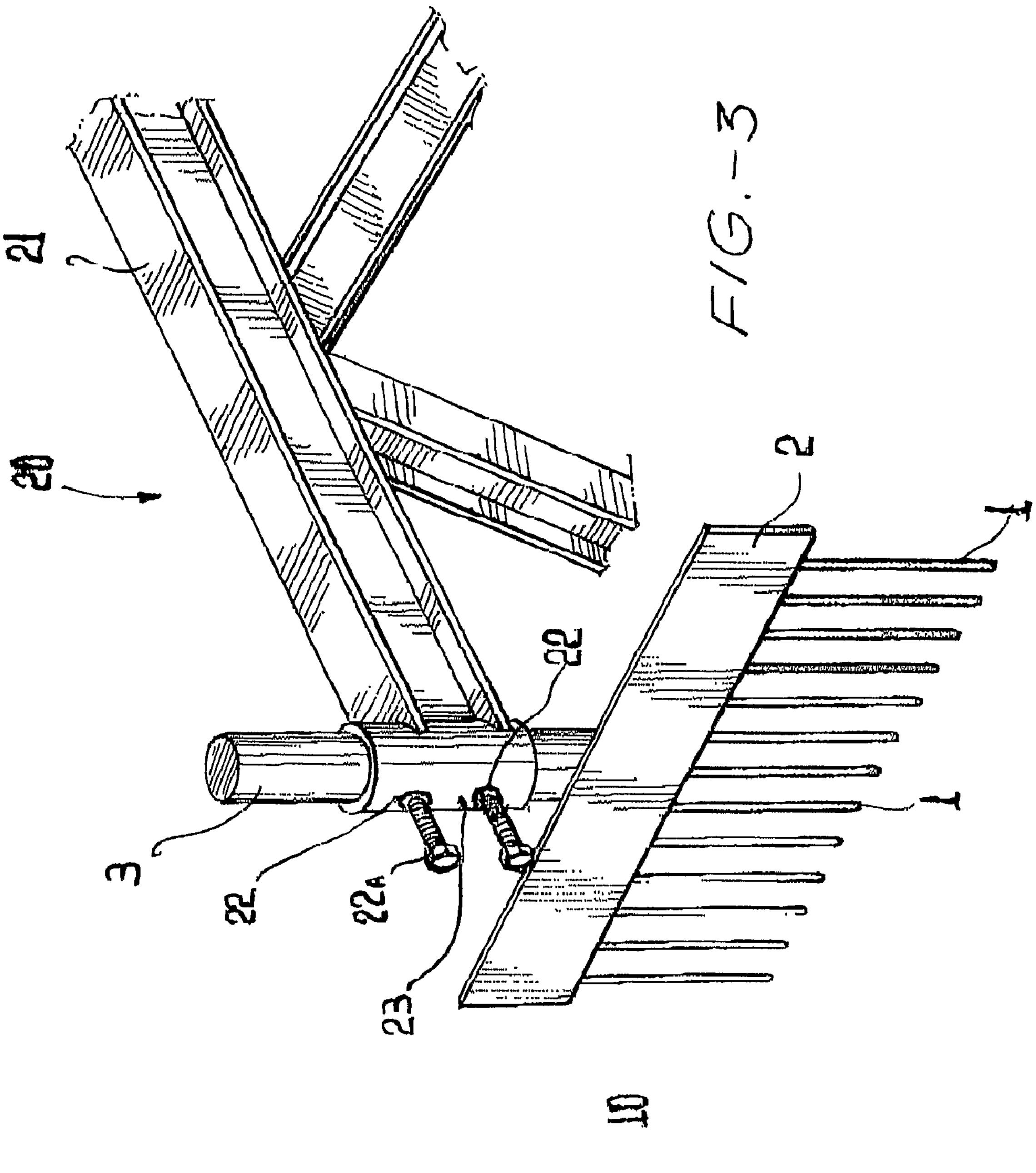
FIG. 3 shows a perspective view of the device for eliminating oversize pellets from balling disks, taken in the direction of arrow A in FIG. 1.

The vertical tubular sleeve 23 of the distal portion of the extensible arm 21 is provided with at least two internally threaded radial bores 22 where there are screwed corresponding clamp bolts 22*a*, which operate directly and radially by the vertical tubular arm 3 of the tool 10. See FIG. 3.

Figure 4:
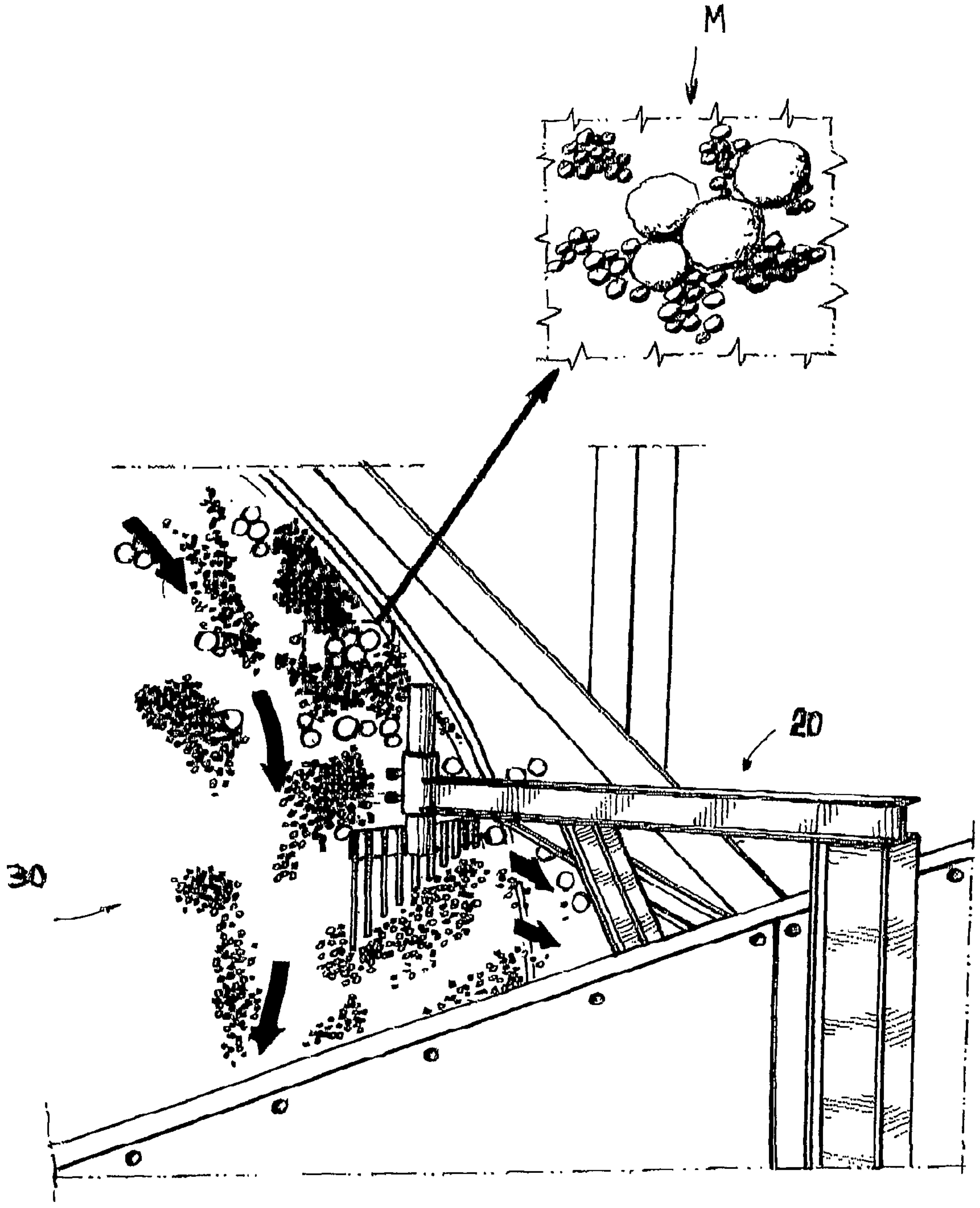
FIG. 4 shows a view of the use of the device for eliminating oversize pellets, as mounted along the balling disk.

The vertical tubular arm 3 is capable of axial rotational movement in relation to the vertical tubular sleeve 23, so as to allow the rods 1-and-plate 2 combination referred to as a plow to move vertically and angularly in relation to the balling disk's 30 plane (see FIG. 4), thus enabling selective adjustment of said plow 1,2 in relation to the edge of the balling disk 30, causing the ore nuclei that form oversize pellets M to be removed to the feed circuit of the pelletization process, thus increasing the intensity of the movement of the unfired ("green") pellets.

The trussed structure 20 is formed by multiple metallic I-sections interconnected to each other and attached on the wall or safety railing 31 of the balling disk 30. See FIG. 4.

It is appropriate to stress that the tool 10 can possess different versions of plow 1,2, where the gaps between the rods 1 are preset to remove oversize pellets M of specific diameters. Another aspect that has not been described or illustrated but should/must be contemplated is the fact that the extensible arm 21 can be provided with telescopic construction so as make it possible to adjust the advancement of the tool 10 towards the center of the balling disk 30.

Although a preferred construction concept has been described, it is appropriate to emphasize that design changes are possible and feasible, without leaving the scope of the present invention.

The invention claimed is:

1. Device for eliminating oversize pellets from balling disks, said device comprising a plow tool including cylindrical rods that are coplanar and parallel to each other and incorporated into a horizontal plate, the horizontal plate incorporating a vertical tubular arm in a medial portion, the vertical tubular arm protruding vertically and upwardly axially into and through a vertical sleeve so as to be selectively and adjustably attached to the vertical sleeve, the vertical sleeve being incorporated into an extremity portion of an extensible arm of a fixed trussed structure adjacently fixedly attached to a balling disk and the extensible arm protruding over an area of operation of the balling disk, said vertical sleeve being provided with at least two internally threaded radial bores having screwed corresponding clamp bolts extending radially through said radial bores of said vertical sleeve with said clamp bolts operating directly and radially on the vertical tubular arm of the plow tool, and with the vertical tubular arm being axially slidable within and through the vertical sleeve for fixing of a positioning of the plow tool with respect to the balling disk so that the rods and plate together move vertically and angularly in relation to a plane of the balling disk and with respect to the fixed trussed structure until locked in position by the clamp bolts.

2. Device for eliminating oversize pellets from balling disks in accordance with claim 1, wherein the extensible arm is adjacently attached to the balling disk.

* * * * *